United States Patent [19]

Borgendale et al.

[11] Patent Number: 5,767,849

[45] Date of Patent: Jun. 16, 1998

[54] PERSONALITY NEUTRAL WINDOW MANAGEMENT SUBSYSTEM

[75] Inventors: Kenneth W. Borgendale; Ian Michael Holland; Kelvin Roberick Lawrence, all of Boca Raton; Colin Victor Powell, Highland Beach, all of Fla.; Richard Lee Verburg, Austin, Tex.

[73] Assignee: International Business Machines Corporation, Armonk, N.Y.

[21] Appl. No.: 516,777

[22] Filed: Aug. 18, 1995

[51] Int. Cl.⁶ .................................................. G06F 3/14
[52] U.S. Cl. ........................................ 345/335; 345/326
[58] Field of Search ................................. 395/333, 335, 395/340, 346, 712, 680, 682, 683, 326

[56] References Cited

U.S. PATENT DOCUMENTS

| | | | |
|---|---|---|---|
| 4,700,320 | 10/1987 | Kapur | 345/344 |
| 5,083,262 | 1/1992 | Haff, Jr. | 395/500 |
| 5,204,947 | 4/1993 | Bernstein et al. | 345/357 |
| 5,233,686 | 8/1993 | Rickenbach et al. | 345/344 |
| 5,265,206 | 11/1993 | Shackelford et al. | 395/683 |
| 5,265,252 | 11/1993 | Rawson, III et al. | 395/681 |
| 5,274,819 | 12/1993 | Blomfield-Brown | 395/670 |
| 5,291,585 | 3/1994 | Sato et al. | 395/500 |
| 5,297,249 | 3/1994 | Bernstein et al. | 345/356 |
| 5,301,270 | 4/1994 | Steinberg et al. | 345/326 |
| 5,327,532 | 7/1994 | Fults et al. | 345/335 |
| 5,390,314 | 2/1995 | Swanson | 395/705 |
| 5,408,602 | 4/1995 | Giokas et al. | 345/329 |
| 5,430,836 | 7/1995 | Wolf et al. | 345/335 |
| 5,596,702 | 1/1997 | Stucka et al. | 345/340 |
| 5,613,090 | 3/1997 | Willems | 395/500 |
| 5,673,403 | 9/1997 | Brown et al. | 345/335 |

FOREIGN PATENT DOCUMENTS

| | | |
|---|---|---|
| 499404A2 | 8/1992 | European Pat. Off. . |
| 597395A1 | 5/1994 | European Pat. Off. . |
| 603095A2 | 6/1994 | European Pat. Off. . |

OTHER PUBLICATIONS

IBM Technical Disclosure Bulletin, vol. 30, No. 4, p. 1617, Sep. 1987, G.M. Beauregard, K.E. Duvall, L. K. Loucks and A. Wilson, "Device–Independent Soft Copy To Hard Copy Support".

IBM Technical Disclosure Bulletin, vol. 36, No. 12, pp. 169–171, Dec. 1993; J.A. Cook and R. L. Verburg, "Graphics Adapter Programming Interface With Separable Device Drivers".

UMI Article Clearinghouse, pp. 11–40, Andrew Schulman and Ray Valdes, "Porting Apple Macintosh Applications To the Microsoft Windows Environment".

Primary Examiner—Matthew M. Kim
Assistant Examiner—Crescelle N. dela Torre
Attorney, Agent, or Firm—Mark S. Walker; Andrew J. Dillon

[57] ABSTRACT

A window management system resident in a computer operating system provides a generic windowing interface for application programs written to operate with various specific graphical user interfaces. The window management system includes a common graphical user interface (GUI) which receives window related application programming interface (API) calls from the application programs, and transforms the various types of API calls native to a particular GUI, into a generic format compatible a personality neutral common windowing format. The personality neutral calls are then be passed from the CGUI to a personality neutral event/window management server which services the calls, and controls the creation, deletion and modification of the various windows on the display. The present invention allows user to "port" application programs written for one GUI, to a computer system operating a different GUI.

14 Claims, 3 Drawing Sheets

PERSONALITY NEUTRAL WINDOW MANAGEMENT SUBSYSTEM

FIELD OF THE INVENTION

The present invention relates to computer graphics, and more particularly to a window management system which supports the simultaneous operation of a plurality of different graphical user interfaces on a single display.

BACKGROUND OF THE INVENTION

The past decade was a revolutionary time in computing. The advent and proliferation of personal computers has transformed the computer environment from one of large mainframe computer systems which was highly centralized and tightly controlled, to a network of interconnected personal computers and workstations which are often widely distributed yet easily accessible via computer networking.

Concomitant with this change in computer environments is the significant change in the way a user interfaces with the computer. In the past, the display of information on the screen was primarily alphanumeric. In addition, commands such as operating system commands (e.g., DOS commands) were input through a keyboard to control the computer. These commands were often archaic and difficult for users to understand and work with, particularly nontechnical users, without first investing significant amounts of time to learn the commands.

A revolution in computing occurred when the graphical user interface (GUI) was introduced. This user interface is displayed on the monitor to the user, and as its name suggests, is primarily graphics oriented. Rather than typing commands into the computer via a command line, the GUI allows users to control the operation of the computer via the manipulation of icons and dialog boxes displayed on the monitor within a region referred to as a "window". Each icon represents a functional task which the user can select for execution by simply clicking on the icon. The term "window" is well known in the art, and is generally a rectangular region on a computer display, which receives user inputs and displays output.

GUIs generally include a window management system which enables a user to establish, destroy, minimize and maximize windows on the display screen. The window management system, places control bars (e.g., a scroll bar) and title bars, and controls the Z-ordering and clipping of the various windows on the display screen. In response to a request from an application program, the window manager establishes a window and allocates a region of the display screen for in which the window the application program can use to present information on the display.

To draw within a window, GUIs generally also include a graphics controller which draws lines, circles, points, which controls how the data to be displayed is presented on the display. Oftentimes, the display of the computer system having a plurality of windows is referred to as a "desktop" with each window seemingly representing a piece of paper lying on the desktop.

The first personal computer to gain widespread commercial acceptance for the GUI was the Macintosh® personal computer by Apple Computer, Inc. Based upon the popularity of the GUI for the Macintosh and its obvious advantages such as its user friendly nature, GUIs quickly gained widespread acceptance.

Software developers for IBM compatible personal computers also introduced GUI products. The first widely used GUI for IBM compatible personal computers (hereinafter "PC") was WINDOWS™ developed by Microsoft Corporation (MS). WINDOWS runs on top of the DOS operating system and provides a "shell" (i.e., an interface) between application program and the operating system. The WINDOWS GUI allows a user to control the execution of application program(s) by pointing and clicking with a pointer device (e.g., a mouse or trackball) on the screen. Due to the market acceptance of the WINDOWS GUI, application program vendors moved quickly to introduce products into the market which operated with the WINDOWS GUI.

IBM also introduced a new operating system known as OS/2® which included its own GUI referred to as PRESENTATION MANAGER™. In order to use OS/2 and its GUI PRESENTATION MANAGER, application program vendors had to update their products to operate with PRESENTATION MANAGER so the application program could display information on the screen.

As different GUIs entered the market, compatibility became a problem since each GUI had its own application programming interface (API) with particular functions an application program would call to interface with the GUI. API calls generally fall into two categories 1) windows related, and 2) graphics related. With a GUI, the application program no longer has direct control over the display; the application simply passes information and commands to the GUI via API calls, and the GUI issues the necessary commands to a graphics engine to display the information on the screen. Therefore, an application program written to operate with a particular GUI was limited to operating with only that GUI.

As an example, if an application program was written to execute with the OS/2 PRESENTATION MANAGER graphical user interface, it could not be executed on a computer running the WINDOWS graphical user interface since the API calls were different. Hence, application program vendors have had to supply different versions of their application program for each GUI. Thus users have to select between the DOS, WINDOWS or PRESENTATION MANAGER compatible version of the same application program.

In an attempt to resolve this problem, IBM introduced a version of OS/2 which allowed applications written for GUIs other than PRESENTATION MANAGER to execute using the PRESENTATION MANAGER graphical user interface. This version was designated OS/2 Version 2.1 Special Edition and it allowed an application program, such as the word processing package Microsoft WORD 6.0 for WINDOWS, to be run on the PRESENTATION MANAGER GUI. This version of OS/2 also included the capability that multiple windows could be displayed on the screen simultaneously, wherein each window may contain information from applications written for different GUIs.

A problem with this earlier IBM approach was that it required that WINDOWS be loaded and resident in RAM. Therefore, in order to have the flexibility to run non-OS/2 based applications using the PRESENTATION MANAGER GUI, the user had to execute both WINDOWS and OS/2 PRESENTATION MANAGER. This was a costly solution since it required that the user have both OS/2 and WINDOWS resident and operating on the computer. In addition, this approach required a large amount of code. If a user was running several windows on the screen, each window used its own dedicated window manager to control the window.

European Patent Application, EP 0 597 395 A1, published May 18, 1994 discloses a system which allows an application program written for a certain GUI (e.g., PRESENTA- TION MANAGER), to be run on a system using a different GUI. The system uses a mapping layer to transform the API calls from PRESENTATION MANAGER running in one CPU, to a format compatible with the GUI operating in another CPU. This system relates to displaying information from an application program running in a remote CPU having a certain GUI, on a CPU running a different GUI which interconnected over a network. The system does not allow the "porting" of application programs between various types of computer systems and their different GUIs since it requires two CPUs. Another problem with this system is that mapping layer of code adds a layer of complexity which slows the system down and adds redundancy to the code.

It would therefore, be desirable to provide window management services routine which allows applications having different GUIs to run simultaneously on the same desktop.

SUMMARY OF THE INVENTION

An object of the present invention is to allow application programs written for different graphical user interfaces to be executed together on a single desktop.

Another object of the present invention is to provide a personality neutral common window management system capable of interfacing with application programs written for various graphical user interfaces.

Yet another object of the present invention is to provide a common graphical user interface which allows application programs written for other graphical user interfaces, to be imported and seamlessly executed on a desktop controlled by the common graphical programming interface.

Briefly, the present invention is a window management system resident in a computer operating system which provides a generic windowing interface for application programs written to operate with various specific graphical user interfaces. The window management system includes a common graphical user interface (CGUI) which receives window related application programming interface (API) calls from the application programs, and transforms the various types of API calls native to a particular graphical user interface, into a generic format compatible with a personality neutral common windowing format. The personality neutral calls are then passed from the CGUI to a personality neutral event/window management server which services the calls, and controls the creation, deletion and modification of the various windows on the display.

The CGUI also includes an event/message server which routes event information and messages between the personality neutral event/window management server and each of the GUIs and application programs.

To handle the API calls associated with the various types of graphical user interfaces supported by the CGUI, the CGUI includes a plurality of GUI specific front-end interfaces, each associated with a particular type of GUI, such as OS/2 PRESENTATION MANAGER, MS WINDOWS, X-WINDOWS™, etc., and which each receive API function calls from application programs written for that particular type of GUI. Each windowing front-end interface receives the API call from a corresponding GUI and transforms the GUI specific personality neutral API calls.

The CGUI also includes a plurality of windowing back-end interfaces each of the windowing back-end interfaces associated with a corresponding one of the plurality of GUI specific windowing front-end interfaces. Each windowing back-end interface converts the call received from the windowing front-end interface into a format compatible with the common event/window management server and passes the transformed calls onto the common event/window management server. The common event/window management server is personality neutral since the application programming interface between it and each of the plurality of windowing back-end interfaces is the same.

The common event/window management server is a special trusted application which performs window management services such as establishing a window, destroying a window, window clipping, Z-ordering, and other relatively low level windowing tasks.

The window manager system of the present invention is a personality neutral windowing interface since it allows application programs written for a first graphical user interface to operate on a computer executing a second different graphical user interface. As an example, the PRESENTATION MANAGER GUI which runs on top of the OS/2 operating system may be modified to incorporate the personality neutral windowing management system of the present invention such the resultant modified GUI can display information for various application programs written for other GUIs such as WINDOWS, X-WINDOWS, Macintosh or other known graphical user interfaces.

The present invention allows a single window manager to create and remove windows displayed on the desktop, along with the control of those windows including clipping, Z-ordering, dragging-and-dropping, and hiding and showing windows as required in response to user commands.

An advantage of the present invention is that users can now use a single graphical user interface and operating system to execute application programs written for different graphical user interfaces.

In addition, the architecture of the window management server reduces the code required to implement the personality neutral window management server and enhances reuse of the code.

These and other objects, features and advantages of the present invention will become more apparent in light of the following detailed description of a preferred embodiment thereof, as illustrated in the accompanying drawings.

DESCRIPTION OF THE PREFERRED EMBODIMENT

Figure 1:
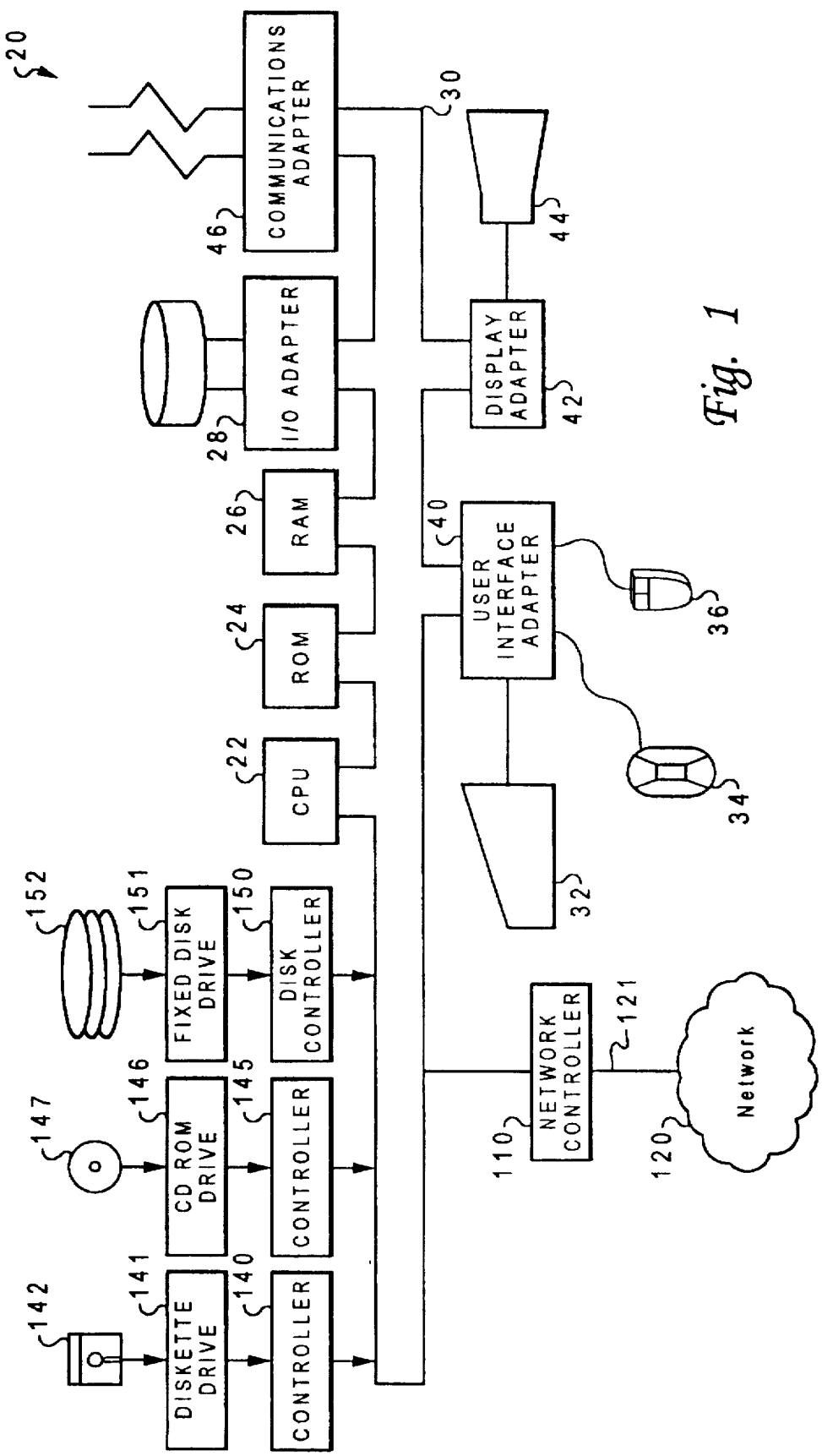
FIG. 1 is an pictorial illustration of multiple windows being displayed on a display using a single graphical user interface.

Referring now to FIG. 1, a personal computer system 20 includes a central processing unit (CPU) 22 (e.g., PENTIUM™, POWERPC™, etc. . . ), ROM 24, RAM 26, and an I/O adapter 28 which are all interconnected via a system bus 30. The system also includes a keyboard 32, trackball 34, mouse 36, and a speaker 38 which are interconnected to the bus 30 using well-known techniques via a user interface adapter 40. To present information to the user, the system includes a display adapter 42 (e.g., a super VGA card) which receives commands and data to be displayed via the bus and displays the data on a monitor 44 such as a CRT or a flat panel display. The system also includes a communications adapter 46 which allows the system to be interconnected to a local area network (LAN) or a wide area network (WAN).

The computer 20 executes a software operating system (e.g., OS/2) which in a well known manner provides centralized resource management for the CPU, memory, mass-storage devices, I/O devices such as the keyboard, display and mouse and the communication interfaces. The operating system generally includes a kernal, device driver routines and dynamic link libraries which the application programs indirectly interact with through a graphical user interface. The operating system may for example be provided as a multi-tasking operating system which allows several applications to be displayed simultaneously on the monitor within their own window.

Figure 2:
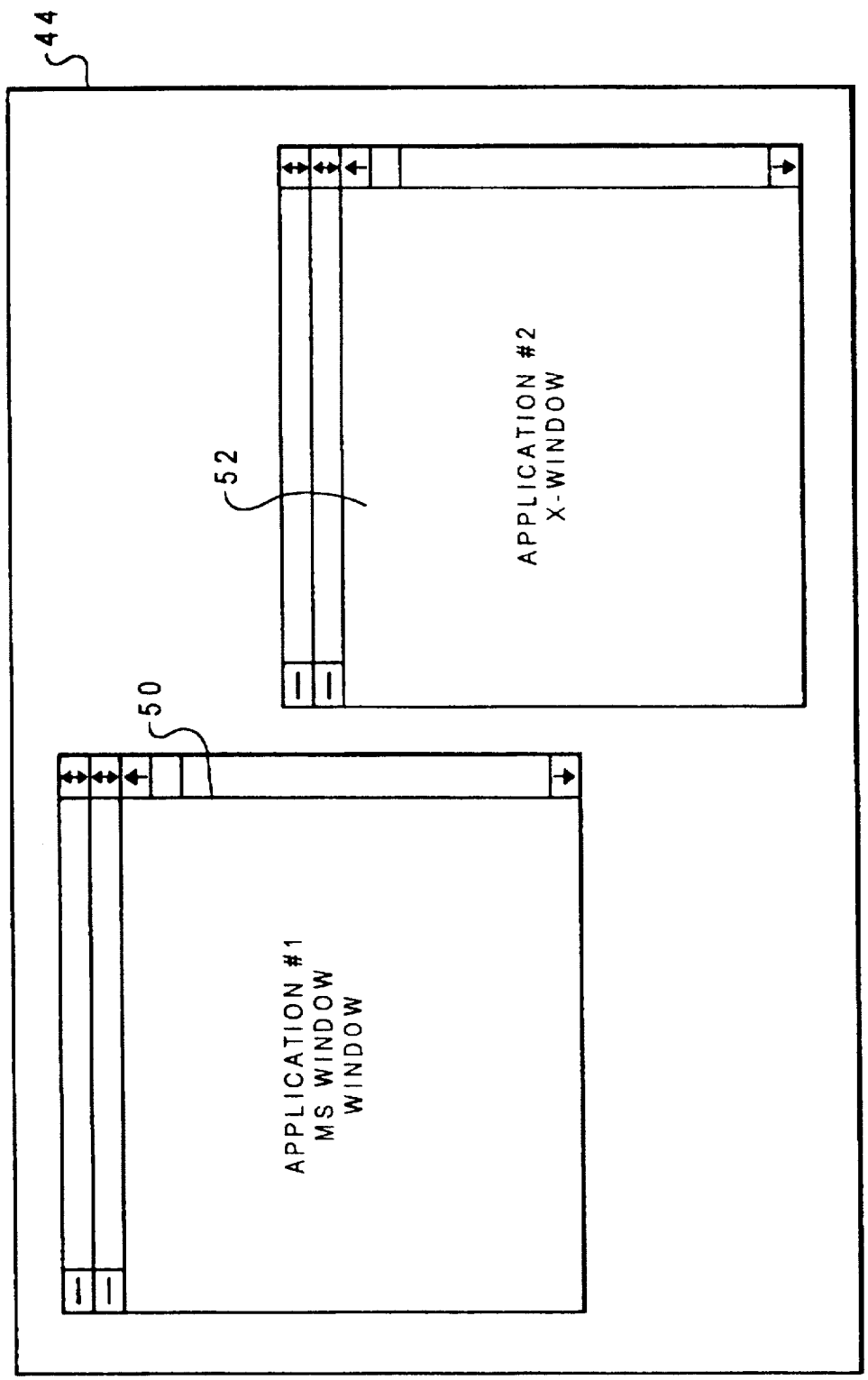
FIG. 2 is a block diagram of a personal computer system.

The present invention is directed to a computer system executing a single graphical user interface and operating system capable of executing application programs written for different graphical user interfaces. This allows user written for various graphical user interfaces between different computer systems. FIG. 2, for example, illustrates a screen 49 viewed on the monitor 44 (FIG. 1). Screen 49 includes two windows 50,52. The windows 50, 52 represent information from different application programs being executed by computer system 20 (FIG. 1). For example, the application program running within window 50 may be a word processing application written for an MS WINDOWS GUI, while the application program running within window 52 may be a spreadsheet application written for a UNIX® based X-WINDOWS GUI. Of course, many other applications are capable of being run in the windows 50, 52, and those of ordinary skill in the art will recognize of course that more than two windows may be simultaneously displayed on screen 49.

Figure 3:
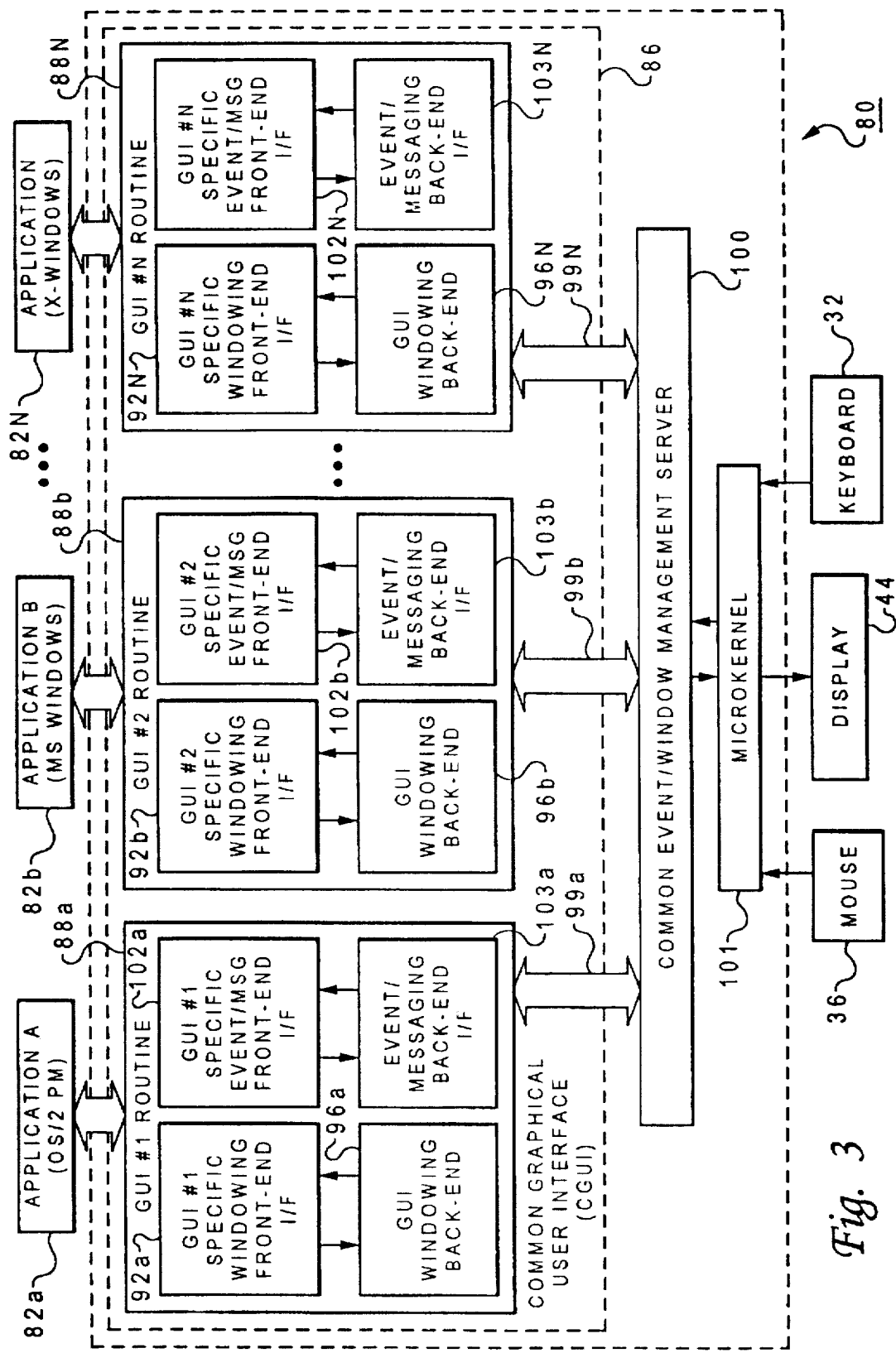
FIG. 3 is a functional block diagram of a personality neutral common window management system.

Referring now to FIG. 3, a common windowing management system 80 which controls the windows (e.g., 50, 52 FIG. 2) displayed on the display 44 is adapted to receive windowing related API calls from a plurality of different application programs 82a–82N generally denoted 82 which are being concurrently executed by the computer system 20.

In this particular example, the application programs 82 include a first application program 82a written to cooperate with the OS/2 PRESENTATION MANAGER GUI, a second application program 82b written to cooperate with the MS WINDOWS 3.1 based GUI and a third application program 82N written to cooperate with the X-WINDOWS GUI. Typical windowing API calls include but are not limited to calls to create windows, delete windows and control the Z-ordering and clipping of the windows presented on the display.

Each of the windowing related API calls from application programs 82 are input to a common graphical user interface (CGUI) 86 which includes a plurality of personality specific GUI routines 88a–88N generally denoted 88. Each of the personality specific GUI routines 88 interface with a particular one of the above identified GUIs. Thus, CGUI 86 supports, for example, the OS2 PRESENTATION MANAGER GUI, the MS WINDOWS GUI and the X-WINDOWS GUI.

CGUI 86 may also support Macintosh and other known GUIs. The particular number of personality specific GUI routines 88 included in CGUI 86 depends upon a variety of factors including but not limited to the number of different application programs 82 which the CGUI is capable of concurrently executing. For example, if the CGUI 86 was capable of executing application programs written for five different types of GUIs, CGUI 86 would include five personality specific GUI routines 88 to translate GUI API calls from a GUI specific format to a format compatible with the personality neutral windowing system of the present invention.

Taking GUI routine 88a as representative of GUI routines 88b–88N, personality specific GUI routine 88a includes a GUI specific windowing front-end 92a which receives the windowing related API calls from a particular one of the application program and decodes the personality specific windowing API calls to determine the specific lower level calls necessary to perform the windowing tasks associated with the particular call. The calls are then passed to a windowing back-end 96a which translates the GUI specific commands into personality neutral windowing API calls the personality neutral windowing calls. The personality neutral windowing calls are subsequently provided over a data path 99a to a common event/window management server 100. Thus, each of the personality specific GUI modules 88a–88N receives personality specific GUI command from a respective one of the application programs 82a–82N and provides at a corresponding one of the data paths 99a–99N a personality neutral GUI command.

Since the windowing commands sent from each of the personality specific GUI routines 88 to the common event/window management server 100 are independent of the GUI for which the application program was written, the interface between each of the GUI windowing back ends 96a–96N is the same. The interface between the windowing back-ends 96 and the common event/window management server 100 is thus referred to as personality neutral and therefore a single, common event/window management server 100 can support all the GUIs.

Prior art techniques, on the other hand, use multiple window management servers each of which is dedicated to support one of the GUIs which the system can run.

The personality neutral event/window management server 100 of the present invention, however, maintains all system window definitions in a single location and supports windowing in a manner which is transparent to all the application programs executing on the computer system 20.

To control the windows, the common event/windowing management server 100 transmits commands to a microkernel 101. Microkernel 101 includes a display device driver (not shown) which issues the appropriate display dependent commands to control the windows (e.g., 50,52 in FIG. 2) displayed on the display.

The common event/window management server 100 is a special application which controls the windows on the desktop (i.e., controls the windows displayed on the screen) and establishes, modifies and deletes windows as a function of the API calls from the various application programs 82. As an example, the common event/window management server 100 supports well known windowing tasks such as clipboard, data exchange, drag-and-drop, window sizing, launching applications and hiding and showing windows (e.g., window clipping and Z-ordering).

The common event/window management server 100 manages first level windows for main frame buffers, overlay planes, and video masking planes (i.e., a black hole manager). The window manager 100 also specifies the input focus policy and controls the default window decorations. Generally, it is preferred that the window decorations (e.g., title bars, command lines, etc. . . ) will be provided in the native style of the application's GUI personality. Thus, even for a WINDOWS application running on the OS/2 PRESENTATION MANAGER, the window will have decorations analogous to a WINDOWS native execution of the application. In the case of an application that does not have a "native" GUI format, the desktop will provide decorations in its usual style.

The common windowing system of the present invention preferably uses an event driven message based input/output architecture to connect the user interface to the PRESENTATION MANAGER application. In such a system, events such as user keyboard inputs and mouse clicks are translated by the operating system into messages which are sent to the appropriate one of the application programs 82. Each message generally includes: 1) a handle to identify the window the message is associated with, 2) the message type, and 3) the data of the message. If the message contains a large mount of data it may contain a pointer to the message data in memory. Examples of windowing related messages for an OS/2 based operating system include WM_CREATE, WM_SIZE and WM_CHAR.

To translate events into messages, event inputs from the keyboard 32 and mouse 36 are input to a microkernel 101 which includes mouse and keyboard drivers. The mouse and keyboard drivers each route event information to the common event/window management server 100. The server 100 determines in which window the event occurred (e.g., which window was active) and the position of the mouse pointer within the window when the mouse button was pressed and released (i.e., "clicked").

The server 100 then generates a message containing the window handle which directs the message to the personality specific GUI routines 88 associated with the window. Each of the personality specific GUI routines 82 includes a message queue. The personality specific GUI routines 88 place the message generated by server 100 in the message queue. The message queue is polled in a regular sequence by the application programs 82 accessing that GUI routine. Window procedures within the application programs act upon the messages and generate the necessary windowing API calls in response to the messages.

Since each GUI will generally deal with messages in a slightly different manner (i.e., personality specific), each of the personality specific GUI routines 88a–88N includes a GUI specific event/messaging front-end interface 102a–102N generally denoted 102 that provides the message data in the format compatible with its associated GUI.

Each event/messaging front-end interface 102 is preferably provided as a dynamically linked library routine (instantiated for each message queue created by an application), implemented in two layers, with an intervening application message queue. The back-end 103a performs common functions such as queue management and message routing. The queue may either include separate queues for events (inputs to the system) and messages (passed by other applications and components) in each application, or a combined application queue. If a combined application queue is used it is necessary to implement event/message priority levels to enable messages to be processed before the events, in the common PMWIN fashion.

The event/messaging front-end interface 102 and back-end form an interface which allows existing OS/2 PRESENTATION MANAGER applications, which use fixed length, pass-by-value messages to communicate with the common event/message management server 100 which preferably uses variable-length, pass-by-packet (or pass-by-reference) messages.

The interface between the CGUI 86 and the common event/window management server 100 is preferably selected to have a high degree of commonality with existing GUIs such as PRESENTATION MANAGER, WINDOWS, X-WINDOWS and Macintosh. This ensures that GUI developers who wish to modify their GUI to work with the common event/window management server 100 will be able to retain some of the code from the their current GUI.

In an alternate embodiment, the invention may be implemented as a computer program product for use with a computer system. Such implementation may comprise a series of computer instructions either fixed on a tangible medium, such as a computer readable media, e.g. diskette 142, CD-ROM 147, ROM 24, or fixed disk 152 (FIG. 1), or transmittable to a computer system, via a modem or other interface device, such as network controller 110 connected to the network 120 over a medium 121, which can be either a tangible medium, including but not limited to optical or analog communications lines, or use wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software; preloaded with a computer system, e.g., on system ROM or fixed disk, or distributed from a server or electronic bulletin board over a network, e.g., the Internet or World Wide Web.

Although the present invention has been shown and described with respect to a best mode embodiment thereof, it should be understood by those skilled in the art that various other changes, omissions and additions to the form and detail thereof, may be made therein without departing from the spirit and scope of the invention.

What is claimed is:

1. A computer system capable of executing application programs written to operate with a plurality of different graphical user interfaces (GUIs), comprising:
    a display;
    a common graphical user interface which includes a plurality of personality specific GUI routines which each correspond to a particular type of GUI, wherein each of said plurality of personality specific GUI routines includes a GUI personality specific windowing interface which receives GUI personality specific application programming interface (API) calls from the application programs and translates the received GUI personality specific API calls into translated API calls which are personality neutral;
    an operating system including a personality neutral common event/windowing management server responsive to said translated API calls, which controls the creation and destruction of all windows displayed on said display, and maintains Z-order and clipping state information of all the windows displayed on said display;
    a memory device for storing the application programs, said operating system and said common graphical user interface; and a central processing unit which executes the applications programs, said operating system and said common graphical user interface.

2. The computer system of claim 1, wherein each of said plurality of personality specific GUI routines includes a GUI specific event/messaging interface which receives messages from said common event/window management server in response user keyboard entries or mouse clicks, and queues the messages in manner accessible to the application programs.

3. The computer system of claim 2 wherein each of said GUI specific event/messaging interfaces includes an event/messaging back-end interface which receives personality neutral message information from said common event/message management server and translates the personality neutral message information to a format compatible with the type of GUI supported by said GUI specific event/messaging interface, and queues the translated message in a GUI specific event/messaging front-end interface which is accessible via application program interface calls by the application programs.

4. The computer system of claim 3, wherein said personality neutral common event/windowing management server receives create window API calls from each of said plurality of personality specific GUI routines and creates a window in response to each create window API call, and returns a message containing a window handle to identify the window the message is associated with along with a starting address for the location of the rectangular window region on said computer display.

5. A method for controlling windows displayed on a computer display by a computer having a CPU and a memory and which is capable of executing application programs written for a plurality of different personality specific graphical user interfaces, the method comprising the steps of:

executing in the CPU a common graphical user interface which is resident in the memory, and which controls the creation and deletion of windows on the computer display;

executing a plurality of application programs in the CPU wherein at least two of said plurality of application programs are native to different personality specific graphical user interfaces;

receiving personality specific application programming interface (API) windowing calls from the application programs;

transforming the API windowing calls from each of the application programs into personality neutral application program interface calls;

providing a common event/window management server; and at said common event/window management server, servicing each of the personality neutral application program interface calls to control the windows displayed on the display for each of the application programs.

6. The method of claim 5, further comprising the steps of:

receiving, at said common event/window management server, event information and translating the event information into personality neutral messages;

generating a message, via the common event/window management, server; and directing the message to one of the plurality of different personality specific graphical user interfaces.

7. The method of claim 6 further comprising the step of placing the message in a message queue.

8. The method of claim 7 wherein after the step of receiving API windowing calls from the application program the method further comprises the step of decoding the personalty specific API windowing calls to determine specific lower level calls necessary to perform windowing tasks associated with the personality specific API windowing calls.

9. A computer system capable of running application programs written to operate with a plurality of different graphical user interfaces (GUIs), the computer system the computer system comprising:

a display;

a plurality of application programs at least two of which are written to operate with different graphical user interfaces;

means for providing a common graphical user interface for each of the various graphical user interfaces, so application programs written for any of the plurality of different graphical user interfaces can be run on said computer system, independent of specific computer code for each of the various graphical user interfaces, an operating system comprising a common event/windowing management system responsive to each of said plurality of personality specific GUI routines and which creates, and destroys windows displayed on said display, and maintains the Z-order and clipping states of all windows displayed on the display;

a memory device for storing the application programs, said operating system and said common graphical user interface; and a central processing unit which executes the applications programs, said operating system and said common graphical user interface.

10. The computer system of claim 9 where said means for providing a common graphical user interface comprises:

a plurality of personality specific windowing front-end interfaces, each of the personality specific windowing front-end interfaces for receiving personality specific application programming interface calls from the application programs; and means for translating the received personality specific application programming interface calls into personality neutral application programming interface calls.

11. The computer system of claim 9 where said means for providing a common graphical user interface comprises:

a plurality of personality specific event-messaging front-end interfaces, each of the personality specific event-messaging front-end interfaces for receiving specific event messages and for providing message data in a format compatible with one of the plurality of different personality specific graphical user interfaces; and a plurality of personality specific event-messaging back-end interfaces, each of the personality specific event-messaging back-end interfaces coupled to one of the personality specific event-messaging front-end interfaces and each of the plurality of personality specific event-messaging back-end interfaces for routing messages between the common event/windowing management system and a corresponding one of the plurality of personality specific event-messaging front-end interfaces.

12. A computer program product for controlling windows displayed on a computer display by a computer having a CPU and memory and which is capable of executing application programs written for a plurality of different personality specific graphical usher interfaces, the computer program product comprising:

a computer useable medium having computer readable program code means for receiving a plurality of personality specific application programming interface windowing calls, each of the plurality of personality specific application programming interface windowing calls compatible with a different one of the plurality of different graphical user interfaces, said computer useable medium further comprising:

computer readable program code means for transforming each of the personality specific application programming interface windowing calls from a personality specific format into corresponding application programming interface windowing calls having a personality neutral format; and computer readable program code means for servicing each personality neutral application program interface call to control a corresponding window displayed on a display of the computer system.

13. The computer program product of claim 12 wherein said computer readable medium further comprises:

computer readable program code means for providing a plurality of personality specific event-messaging front-end interfaces, each of the personality specific event-messaging front-end interfaces for receiving specific event messages and for providing message data in a format compatible with one of the plurality of different personality specific graphical user interfaces; and computer readable program code means for providing a plurality of personality specific event-messaging back-end interfaces, each of the personality specific event-messaging back-end interfaces in communication with one of the personality specific event-messaging front-end interfaces and each of the plurality of personality specific event-messaging back-end interfaces for routing messages between the common event/windowing management system and a corresponding one of the plurality of personality specific event-messaging front-end interfaces.

14. The computer program product of claim 13 wherein the computer readable program code means for servicing each personality neutral application program interface call to control a corresponding window displayed on a display of the computer system further comprises computer readable program code means for controlling a window by transmitting commands to a microkernel having a display device driver.

* * * * *